(12) United States Patent
Champine et al.

(10) Patent No.: US 7,949,880 B2
(45) Date of Patent: *May 24, 2011

(54) SECURE REMOTE PASSWORD VALIDATION

(75) Inventors: Mark A. Champine, Westford, MA (US); Charles W. Kaufman, Sammamish, WA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/692,909

(22) Filed: Jan. 25, 2010

(65) Prior Publication Data

US 2010/0180126 A1    Jul. 15, 2010

Related U.S. Application Data

(62) Division of application No. 10/915,044, filed on Aug. 10, 2004, now Pat. No. 7,669,058.

(51) Int. Cl.
*G06F 21/00* (2006.01)

(52) U.S. Cl. ............................................ 713/183; 726/5

(58) Field of Classification Search .................. 713/183, 713/168; 726/2, 4, 5
See application file for complete search history.

(56) References Cited

U.S. PATENT DOCUMENTS 7,669,058 B2 * 2/2010 Champine et al. ............ 713/183

* cited by examiner

*Primary Examiner* — Minh Dinh
*Assistant Examiner* — Virginia Ho
(74) *Attorney, Agent, or Firm* — Steven M. Greenberg, Esq.; Carey, Rodriguez, Greenberg & Paul

(57) ABSTRACT

A method, system and apparatus for secure password validation can include a local authentication process configured for coupling both to local authentication data and to a remote authentication process. The system also can include a comparator disposed in the local authentication process and programmed to detect an extended password string in the local authentication data. Finally, the system can include a remote authentication handler disposed in the local authentication process and programmed to outsource password validation to the remote authentication process responsive to the comparator detecting an extended password string retrieved for a supplied user identifier. Preferably, the remote authentication handler can be a remote procedure call to the remote authentication process.

9 Claims, 3 Drawing Sheets

SECURE REMOTE PASSWORD VALIDATION

CROSS-REFERENCE TO RELATED APPLICATIONS

This application is a Divisional of U.S. application Ser. No. 10/915,044, filed Aug. 10, 2004 now U.S. Pat. No. 7,669,058, entitled "SECURE REMOTE PASSWORD VALIDATION", the entire teachings of which are incorporated herein by reference.

BACKGROUND OF THE INVENTION

1. Statement of the Technical Field

The present invention relates to applications level security and more particularly to password processing in a computing application.

2. Description of the Related Art

Applications level security has been of paramount concern for applications administrators for decades. While access to an application, its features and data can be of no consequence for the most simple of computing tools such as a word processor or spreadsheet, for many applications, access must be restricted. For example, in financial applications and other such applications processing sensitive data, as well as in computing administration type applications, protecting both confidentiality and access to important and powerful computing functions can be so important so as to require access control.

Generally, applications level security incorporates authentication logic for retrieving or otherwise obtaining unique data such as a pass-phrase, key, PIN, code, biometric data, or other such personally identifying information (collectively referred to as a "password"). Once retrieved, the password along with a user identifier can be compared to a known password for the user. If the comparison can be performed favorably, the password can be validated and access can be granted to the user as requested. In contrast, if the comparison cannot be performed favorably, access to the user can be denied. Moreover, protective measures such as invalid attempt logging can be activated.

Conventional password processing involves the one-way hashing of the known password and the storage of the hash in a data structure. When a user provides a password as part of an attempt to access an application, an application function, or application data, the password can be compared to the hash through a call to logic managing the data structure to determine whether access ought to be granted. Though the encrypted content of the hash can remain safely hidden from prying eyes, one able to access the hash can randomly compare a large number of possible passwords against the hash in what is known as a "dictionary attack".

To circumvent the possibility of a dictionary attack, several password authentication techniques have been proposed. For instance, some have attempted to secure the password hash itself through a common technique known as "salting". Salting ultimately results in dictionary attacks becoming substantially more time and computing intensive. Salting, however, does not secure a single password against brute force guessing. Other techniques include introducing real time delays within the authentication logic in reporting failed attempts. Alternatively, the requestor can be locked out of the authentication logic after a pre-determined number of failed password guessing attempts.

Finally, some have suggested replacing local authentication logic with a remote procedure call to a trusted server providing the password. In this way, the hash can become inaccessible to an attacker as the actual authentication can be performed remotely based upon a communicated request. Of course, to implement the latter would require all authentication logic within the application itself to be located and rewritten. Accordingly, implementing a remote authentication procedure can disrupt the structure of existing applications and can result in the undesirable breaking of the source code of the application.

SUMMARY OF THE INVENTION

The present invention addresses the deficiencies of the art in respect to access control and provides a novel and non-obvious method, system and apparatus for user authentication and password validation. In a password validation method, a user authentication request can be received which can include at least a password and a user identifier for the password. Subsequently, authentication data can be retrieved for the user identifier. In this regard, a hash value for a password corresponding to the user identifier can be retrieved. Notably, responsive to detecting an extended password string in the authentication data, password validation can be outsourced to a remote authentication process. Otherwise the password validation can be processed locally. Consequently, as the extended password string contains an encrypted value, the password string will have been rendered impervious to password guessing or dictionary attack. Yet, in accordance with the preset invention, an existing interface to the password validation logic can be maintained for the benefit of existing applications utilizing the validation logic.

In a preferred aspect of the invention, the detecting step can include detecting an extension header in the authentication data. For instance, the detecting step can include detecting a character in the extension header not available for use in a hash of a password. Consequently, the outsourcing step can include forwarding at least the password and an encrypted form of a hash value extracted from the extended password string to the remote authentication process. In particular, the outsourcing step can include executing a remote procedure call to the remote authentication process. In any case, the forwarding step additionally can include forwarding at least one of a hash type, a canonical user name, and an expiration indicator along with the encrypted form of the hash value.

A system for secure password validation can include a local authentication process configured for coupling both to local authentication data and to a remote authentication process. The system also can include a comparator disposed in the local authentication process and programmed to detect an extended password string in the local authentication data. Finally, the system can include a remote authentication handler disposed in the local authentication process and programmed to outsource password validation to the remote authentication process responsive to the comparator detecting an extended password string retrieved for a supplied user identifier. Preferably, the remote authentication handler can be a remote procedure call to the remote authentication process.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for remotely validating a password. In accordance with the present invention, an extended password string can be formed to include a header indicating the presence of an extended password string along with a network address for a validation process and an encrypted form of a password. Moreover, the hash value or password can be encrypted using a key such that only the validation process can decrypt the hash value. In this regard, the key can be a public portion of a public-private key pairing associated with the validation process. In any case, the extended password string subsequently can be stored in association with a specific user identity.

When a user claiming the specific user identity provides a password for validation, the extended password string can be retrieved and the encrypted form of the password can be forwarded to the validation process along with the claimed user identity and the provided password. In particular, the password, claimed user identity and the extended password string can be provided to the validation processor by way of a remote procedure call. In any event, the validation processor can decrypt the password and, where the decrypted form of the password is a hash value, the hashing function known to the validation processor can be applied to the provided password. The decrypted hash value and hash value produced for the provided password can be compared and the result can be provided to the calling process.

Figure 1:
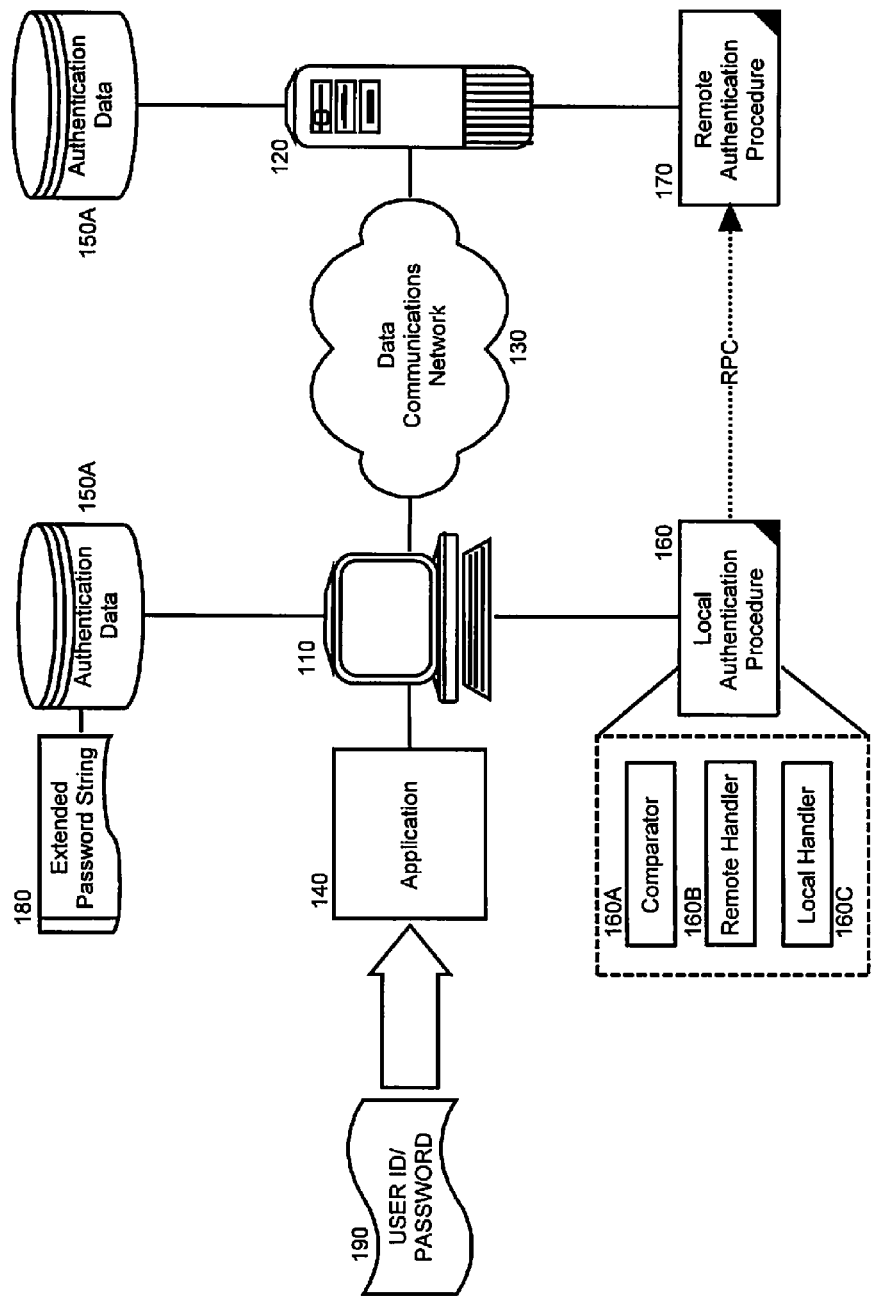
FIG. 1 is a schematic illustration of a password verification system which has been configured in accordance with a preferred aspect of the inventive arrangements.

In further illustration, FIG. 1 schematically depicts a password verification system which has been configured in accordance with a preferred aspect of the inventive arrangements. The system can include a local authentication server 110 configured for use by an application 140. The local authentication server 110 further can be coupled to a remote authentication server 120 over a computer communications network 130. The local authentication server 110 can host a local authentication process 160, while the remote authentication server 120 can host a remote authentication process 170.

The local authentication process 160 can be communicatively linked to local authentication data 150A, for instance where the local authentication data 150A is stored in the local authentication server 110. Similarly, the remote authentication process 170 can be communicatively linked to remote authentication data 150B, for instance where the remote authentication data 150B is stored in the remote authentication server 120. Importantly, the local authentication process 160 can include a local handler 160C programmed to authenticate a user ID/password combination 190 provided through the application 140 based upon the provided password, a known hash function and a pre-stored hash value for a password associated with the user ID as stored in the local authentication data 150A.

Unlike conventional password validation technologies, the system of the invention also can include a remote handler 160B and a comparator 160A. Specifically, when processing a provided user ID/password combination 190, it can be determined in the comparator 160A whether data retrieved for the user ID from the local authentication data 150A includes an extended password string 180. If so, the remote handler 160B can pass the extended password string 180 along with the password and user ID extracted from the combination 190 to the remote authentication process 170 for remote password validation. Otherwise, the validation of the user ID and password can be performed by the local authentication process 160.

The extended password string 180 advantageously can be configured so as to be storable in the local authentication data 150A as would be the case with password information not packaged as an extended password string. For instance, where the extended password string 180 is stored in a field in a database, the format of the extended password string 180 can be such that the storage of the extended password string 180 in the field of the database can be accommodated without modifying logic arranged to access and retrieve data from the field in the database. As an example, FIG. 2 is a pictorial illustration the composition of exemplary password extension strings configured for use in the system of FIG. 1.

Figure 2:
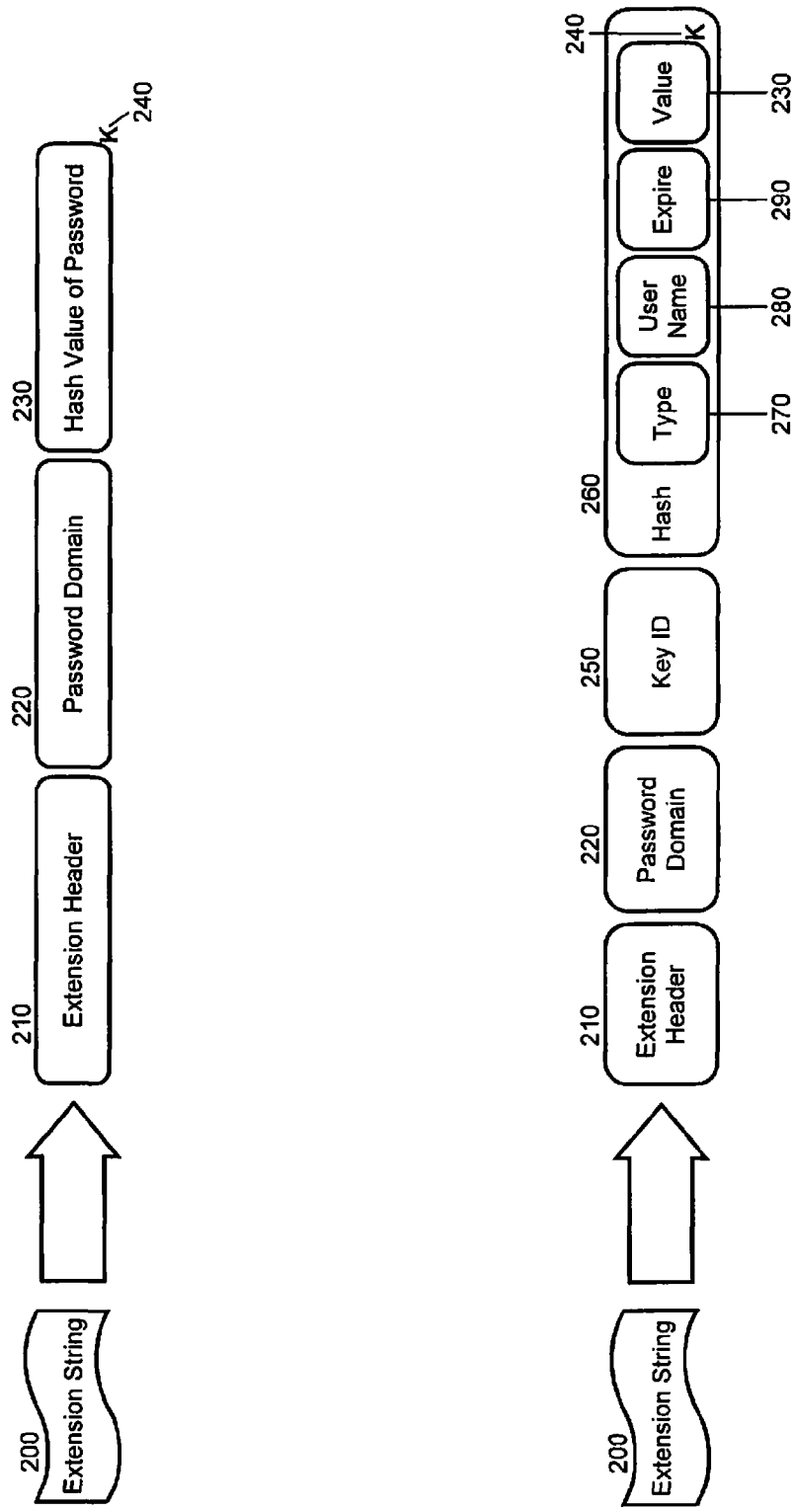
FIG. 2 is a pictorial illustration the composition of exemplary password extension strings configured for use in the system of FIG. 1; and, FIGS. 3A and 3B, taken together, are a flow chart illustrating a process for validating a password in the system of FIG. 1.

Referring to FIG. 2, an extended password string 200 can include an extension header 210, a password domain 220 and a hash value of a password 230 which has been encrypted according to encryption key 240. Specifically, the extension string 200 can include data which can be distinguished from an encoded password sufficient to indicate the presence of an extended password string. For example, where the password data ordinarily stored in a local authentication data structure is Base64 encoded data utilizing hexadecimal values, the extension header 210 can include non-hexadecimal data, such as the letter "G" so as to indicate the presence of the extended password string.

The password domain 220 can be mapped to a network address for a remote server or remote process address space hosting the remote authentication process of the present invention. Utilizing the password domain 220, a local authentication process can properly transmit the user ID, password and extended password string to the remote authentication process for validation. Finally, the hash value of the password 230 can be a hash computed value which further has been encrypted using a key 240 such as the public key associated with the remote authentication process.

In an alternative aspect of the invention, the extended password string 200 can include a key identifier 250 suitable for indicating to the remote authentication process which key to utilize in decrypting the encrypted portion of the extended password string 200. Moreover, in the alternative aspect of the invention, the hash value 260 can include a hash of the password 230 (or possibly multiple hash values) along with an indication of the hash type 270 such as "legacy", "digest-md5", "cram-md5" and the like, a canonical user name 280 which can be used for monitoring and logging password attempts on a per use basis, and an expiration date or time 290 beyond which the password is considered no longer valid.

Once again, the hash 260 can be encrypted using the key 240 such as the public key associated with the remote authentication process.

Figure 3A:
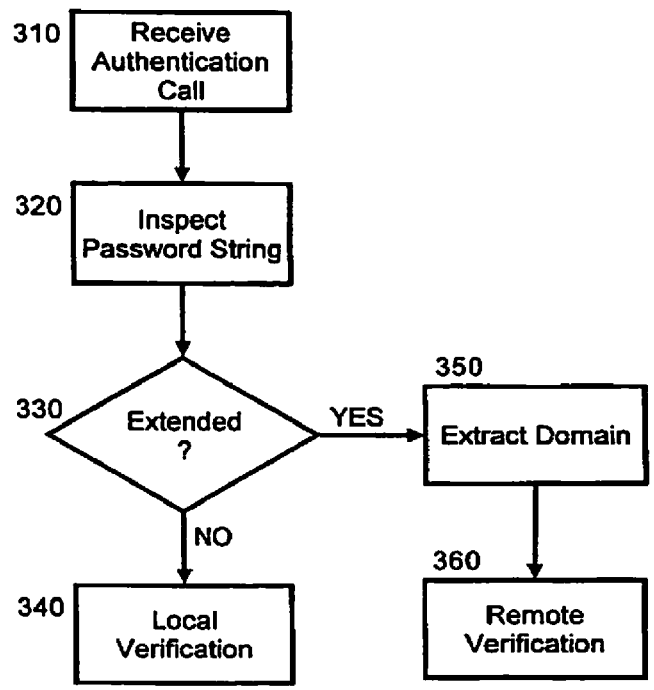

In accordance with the present invention, the local authentication process can discriminately outsource password validation to a remote authentication process based upon the presence of an extended password string for a specified user. In this regard, FIGS. 3A and 3B, taken together, are a flow chart illustrating a process for validating a password in the system of FIG. 1. First considering FIG. 3A, beginning in block 310, a request for authentication can be received in the form of a password validation request. In block 320, authentication data associated with a user ID provided with the authentication request can be retrieved and inspected to determine in decision block 330 if the retrieved authentication data is an extended password string. If in decision block 330 it is determined that the retrieved authentication data is not an extended password string, in block 340 the password can be processed normally, for example by comparing a hash of the provided password with a hash value stored in the retrieved authentication data.

Figure 3B:
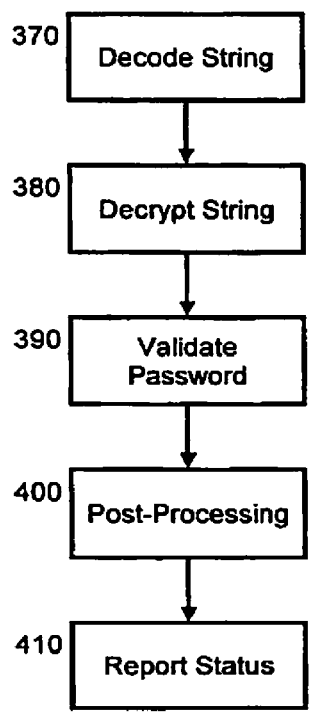

If in decision block 330 it is determined that an extended password string is present in the retrieved authentication data, in block 350 the password domain can be extracted or otherwise read from the extended password string and in block 360, the process of validating the received password can be deferred to the remote authentication process. Turning now to FIG. 3B, in block 370 in the remote authentication process the extended password string can be decoded and in block 380 the hash value for the password can be decrypted using a key known to the authentication process. Finally, in block 390, the password can be validated against the decrypted hash value. Notably, in an alternative embodiment, a hash value stored for the user in association with the remote authentication process can be retrieved by the remote authentication process and validated against a hash of the supplied password.

Optionally, one or more post-processing functions can be applied subsequent to the password validation process in block 400. Such post-processing functions can include logging log-in attempts and the application of password policies such as lock out on a certain number of failed attempts. Finally, in block 410 the validation can be reported to the local authentication process which in turn can report the result of the authentication request to the requesting process or application.

Several advantages to the present arrangement will be recognized by the skilled artisan. First, given the backwards-compatible structure of the extended password string, the interface to the local authentication process need not be changed as the structure of the extended password string will not break a method processing the extended password string unknowingly. Second, by encrypting the has using a key known only to the remote authentication process, even brute-force methods cannot successfully resolve a multiplicity of provided passwords against the encrypted and thereby protected hash. Most, importantly, only the logic of the local authentication process need be changed while all other application logic accessing the local authentication process can remain unaware of the possible outsourcing of password validation duties.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A system for secure password validation comprising:
a computer with at least one processor and memory;
a local authentication process executing in the memory of the computer and configured for coupling both to local authentication data and to a remote authentication process;
a comparator disposed in said local authentication process and programmed to detect an extended password string in said local authentication data; and,
a remote authentication handler disposed in said local authentication process and programmed to outsource password validation to said remote authentication process responsive to said comparator detecting an extended password string retrieved for a supplied user identifier.

2. The system of claim 1, wherein said remote authentication handler is a remote procedure call to said remote authentication process.

3. A non-transitory machine readable storage having stored thereon a computer program for password validation, the computer program comprising a routine set of instructions which when executed by a machine cause the machine to perform the steps of:
receiving a password authentication request comprising at least a password and a user identifier for said password;
retrieving authentication data for said user identifier;
responsive to detecting an extended password string in said authentication data, outsourcing password validation to a remote authentication process; and,
otherwise processing said password locally.

4. The machine readable storage of claim 3, wherein said retrieving step comprises the step of retrieving a hash value for a password corresponding to said user identifier.

5. The machine readable storage of claim 3, wherein said detecting step comprises the step of detecting an extension header in said authentication data.

6. The machine readable storage of claim 5, wherein said detecting step comprises the step of detecting a character in said extension header not available for use in a hash of a password.

7. The machine readable storage of claim 3, wherein said outsourcing step comprises the step of forwarding at least said password and an encrypted form of a hash value extracted from said extended password string to said remote authentication process.

8. The machine readable storage of claim 7, wherein said forwarding step further comprises the step of forwarding at least one of a hash type, a canonical user name, and an expiration indicator along with said encrypted form of said hash value.

9. The machine readable storage of claim 3, wherein said outsourcing step comprises the step of executing a remote procedure call to said remote authentication process.

* * * * *